(12) United States Patent
Hooker et al.

(10) Patent No.: US 8,069,340 B2
(45) Date of Patent: Nov. 29, 2011

(54) MICROPROCESSOR WITH MICROARCHITECTURE FOR EFFICIENTLY EXECUTING READ/MODIFY/WRITE MEMORY OPERAND INSTRUCTIONS

(75) Inventors: Rodney E. Hooker, Austin, TX (US); Gerard M. Col, Austin, TX (US); Colin Eddy, Round Rock, TX (US)

(73) Assignee: VIA Technologies, Inc., New Taipei (TW)

( * ) Notice: Subject to any disclaimer, the term of this patent is extended or adjusted under 35 U.S.C. 154(b) by 898 days.

(21) Appl. No.: 12/100,616

(22) Filed: Apr. 10, 2008

(65) Prior Publication Data

US 2009/0204800 A1    Aug. 13, 2009

Related U.S. Application Data

(60) Provisional application No. 61/027,060, filed on Feb. 8, 2008.

(51) Int. Cl.
*G06F 9/30* (2006.01)
(52) U.S. Cl. ....................................................... 712/245
(58) Field of Classification Search ........................ None
See application file for complete search history.

(56) References Cited

U.S. PATENT DOCUMENTS

| | | | |
|---|---|---|---|
| 5,542,084 A * | 7/1996 | Lowe, Jr. | 345/501 |
| 6,370,625 B1 * | 4/2002 | Carmean et al. | 711/152 |
| 2003/0236967 A1 | 12/2003 | Samra et al. | |
| 2004/0034757 A1 | 2/2004 | Gochman et al. | |
| 2006/0004998 A1 * | 1/2006 | Saha et al. | 712/245 |

OTHER PUBLICATIONS

Patterson, David. Hennessy, John. "Computer Architecture: A Quantitative Approach". Morgan Kaufmann Publishers, Inc. 1996. pp. 251-261 and 278-288.*
Case, Loyd. "The Core 2: Intel Goes for the Jugular." ExtremeTech. Jul. 13, 2006. pp. 1-6. Downloaded Apr. 20, 2010 from http://www.extremetech.com/.
Tian, Xinmin. "Inside the Intel® 10.1 Compilers: New Threadizer and New Vectorizer for Intel® Core™ 2 Processors." Intel® Technology Journal. vol. 11, Issue 04, Published Nov. 25, 2007. p. 263-274.
Intel® 64 and IA-32 Architectures Optimization Reference Manual. Nov. 2009. pp. 3-18 to 3-21.

* cited by examiner

*Primary Examiner* — Robert Fennema
(74) *Attorney, Agent, or Firm* — E. Alan Davis; James W. Huffman

(57) ABSTRACT

A microprocessor instruction translator translates a macroinstruction into three microinstructions to perform a read/modify/write operation on a memory operand. A first microinstruction instructs the microprocessor to calculate a source address and to load the memory operand into the microprocessor from memory at the source address and to calculate a destination address. The second microinstruction instructs the microprocessor to perform an arithmetic or logical operation on the loaded memory operand to generate a result. The third microinstruction instructs the microprocessor to write the result to memory at the destination address calculated by the first microinstruction. A first execution unit receives the first microinstruction and responsively calculates the source address and loads the memory operand into the microprocessor from memory at the source address. A second execution unit also receives the first microinstruction and calculates the destination address. The first and second execution units are distinct execution units within the microprocessor.

25 Claims, 4 Drawing Sheets

304 LD/STA Microinstruction

| Opcode | Source A | Source B | Destination | Displacement |
|---|---|---|---|---|
| 308 | 312 | 316 | 320 | 324 |

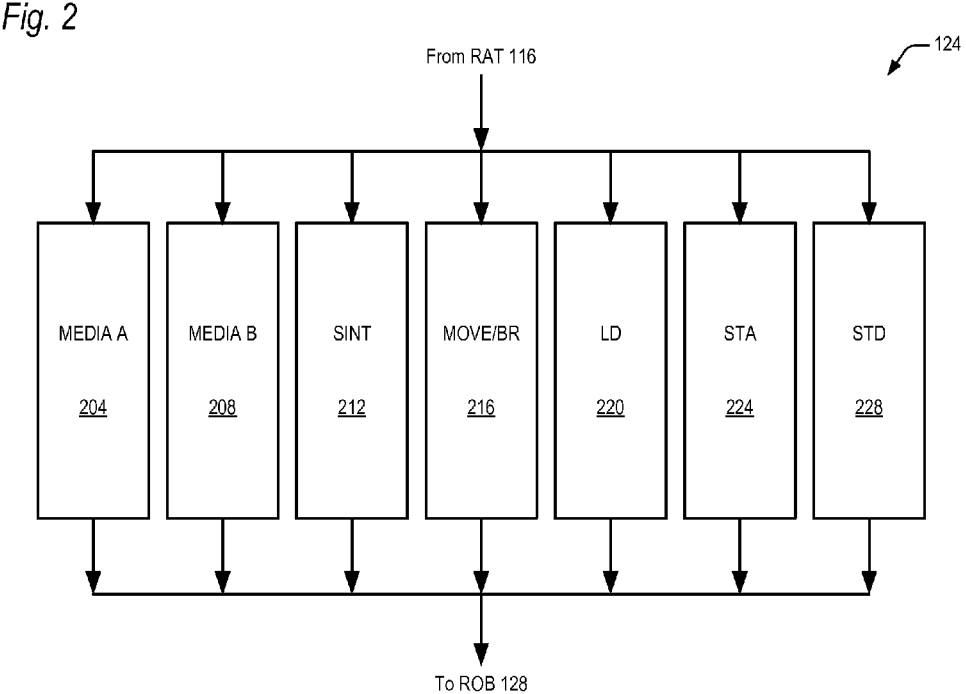

MICROPROCESSOR WITH MICROARCHITECTURE FOR EFFICIENTLY EXECUTING READ/MODIFY/WRITE MEMORY OPERAND INSTRUCTIONS

CROSS REFERENCE TO RELATED APPLICATIONS

This application claims priority to Provisional Application 61/027,060, filed Feb. 8, 2008, which is hereby incorporated by reference in its entirety for all purposes.

FIELD OF THE INVENTION

The present invention relates in general to the field of microprocessors, and more specifically to a system and method for reducing the number of microarchitecture instructions required to execute certain common macroarchitecture instructions.

BACKGROUND OF THE INVENTION

Data processing operations in a computer are typically carried out in a microprocessor. Generally, the microprocessor, which supervises and implements various data processing tasks for the computer, contains hardware components for processing instructions and data. Instructions together with data are typically stored in a computer memory subsystem, which may include Read Only Memory (ROM), Random Access Memory (RAM), hard disk drives, or other devices. The memory subsystem is typically physically separate from the microprocessor, although copies of instructions and data are temporarily stored on the microprocessor during program execution.

An instruction is a group of bits that tell the microprocessor to perform a specific operation. A part of an instruction is an operation code, or opcode. The opcode is a group of bits that specify an operation to be performed by the microprocessor. For example, operations such as adding, or subtracting, or branching program execution, or storing a value to memory may be specified in the opcode. The remainder of the instruction typically provides data sources for the operation, called operands. Operands may be specified within the instruction itself, in a register of the microprocessor, or in a memory location.

The architecture of a microprocessor includes the instruction set of the microprocessor as well as the set of resources, such as registers and memory address space, usable by the various instructions of the instruction set. Many modern microprocessors have both a macroarchitecture and a microarchitecture. In particular, many microprocessors that execute instructions specified by the Intel Architecture, which is also commonly referred to as the IA-32 or x86 architecture, have both a macroarchitecture and microarchitecture. The macroarchitecture is the user-visible architecture, i.e., the instruction set and resources that programmers may use. A macroinstruction is an instruction in the macroarchitecture instruction set. The macroarchitectures of some older popular processors, such as the x86 architecture, include very complex instructions. In contrast, the microarchitecture includes a microinstruction set and the set of resources usable by the various instructions of the microinstruction set. The microinstruction set typically includes much simpler instructions than the macroinstruction set and is typically not user-visible, although some microprocessors may make the microinstruction set as well as the macroinstruction set visible to the user. The execution units of the microprocessor actually execute microinstructions rather than macroinstructions.

The microprocessor includes an instruction translator that translates each macroinstruction into one or more microinstructions that are executed by the execution units, depending on the macroinstruction opcode and operands. The width of the instruction translator, i.e., the number of microinstructions the translator can generate per clock cycle, is a design decision that has competing interests. On the one hand, the narrower the instruction translator is, the smaller and potentially less complex it can be, which is beneficial in terms of cost, silicon real estate, speed, and thermal requirements. On the other hand, the wider the instruction translator the greater its ability to provide a sufficient rate of microinstructions to keep the execution units utilized, which is a concern in superscalar, out-of-order execution microprocessor designs.

Many modern microprocessors that have separate macroarchitectures and microarchitectures also include a microinstruction ROM in addition to the instruction translator. The microinstruction ROM is typically used to handle more complex and infrequently used macroinstructions that require a relatively large number of microinstructions to perform the operation specified by the associated macroinstruction. The microinstruction ROM includes sequences of microinstructions associated with individual macroinstructions. When the instruction translator encounters certain macroinstructions it transfers control to a microinstruction sequence in the microinstruction ROM rather than, or in addition to, generating microinstructions, and when the microinstruction sequence completes it transfers control back to the instruction translator. However, there may be a performance penalty associated with transferring control to a microcode ROM sequence relative to the instruction translator simply generating the microinstructions required to perform the associated macroinstruction operation, for example, bubbles may be introduced into the execution pipeline because the fetch unit is not supplying microinstructions at a sufficient rate to keep the execution units utilized. On the other hand, the width of the instruction translator limits the number of microinstructions it can generate each clock cycle, and the microinstruction ROM can be expanded economically to handle macroinstructions requiring more microinstructions than the instruction translator is designed to generate in a given clock cycle.

An example of a macroinstruction that requires a relatively large number of microinstructions is a macroinstruction that performs read/modify/write operations on an operand in memory. Macroinstructions that perform read/modify/write operations on an operand in memory are referred to herein as LdAluSt macroinstructions because they include a memory load operation to get the operand from memory into the microprocessor, an ALU operation to modify the memory operand, and a memory store operation to write the modified result back to its original location in memory. Each of the constituent load, ALU, and store operations may require one or more microinstructions to perform the respective operation. An example of a LdAluSt macroinstruction is an x86 ADD [mem], EAX instruction. This instruction loads the operand from the memory location specified by the [mem] address into the microprocessor, adds the memory operand to the value in the EAX register, and stores the resultant sum of the addition operation in the memory location specified by the [mem] address.

Each of the constituent load, ALU, and store operations of a LdAluSt macroinstruction may require one or more microinstructions to perform the respective operation. If the number of microinstructions that must be generated to perform the LdAluSt macroinstruction is greater than the width of the instruction translator, then the microinstruction ROM must be employed, or the instruction translator would have to generate the microinstructions over multiple clock cycles, which would likely significantly increase the complexity of the instruction translator. However, because LdAluSt macroinstructions are frequently used in many programs, it is desirable to avoid branching to a microinstruction ROM sequence to execute all or a portion of a LdAluSt macroinstruction.

Therefore, what is needed is a microprocessor that executes LdAluSt macroinstructions in a high performance manner and which includes a relatively fast, small, and low power consumption instruction translator.

SUMMARY OF THE INVENTION

The present invention provides a superscalar out-of-order execution microprocessor that includes in its microinstruction set a new merged LD/STA microinstruction. The LD/STA microinstruction performs the combined operations that would otherwise be performed by distinct LD and STA microinstructions. Unlike conventional microinstructions which are dispatched to a single execution unit, the LD/STA microinstruction is dispatched to two execution units, namely a LD unit and a STA unit, respectively. Although each of the LD unit and STA unit execute the LD/STA microinstruction, the LD/STA microinstruction occupies a single slot in the reorder buffer of the microprocessor. Both execution units must indicate that they have completed the LD/STA microinstruction before the reorder buffer can retire the LD/STA microinstruction.

The present inventors realized that the operands of the LD microinstruction are a subset of the STA microinstruction and that the two microinstructions could therefore be advantageously combined into the single LD/STA microinstruction. This is advantageous because it allows the instruction translator to translate a LdAluSt macroinstruction into three microinstructions rather than four. This enables the instruction translator according to one embodiment of the microprocessor to be a three-instruction-wide translator, which is potentially smaller, faster, and has lower power consumption than a four-instruction-wide translator, without transferring control to a microcode ROM to process the LdAluSt macroinstruction, which is a frequently used macroinstruction. In another embodiment, the instruction translator is larger than three instructions wide; however, the single LD/STA microinstruction advantageously enables the instruction translator to translate a LdAluSt macroinstruction and another macroinstruction in the same clock cycle.

In one aspect, the present invention provides a microprocessor having a macroinstruction set in its macroarchitecture that includes a macroinstruction that instructs the microprocessor to perform a read/modify/write operation on an operand in memory. An instruction translator translates the macroinstruction into three microinstructions to perform the read/modify/write operation on the memory operand. A first microinstruction instructs the microprocessor to calculate a source address and to load the memory operand into the microprocessor from memory at the source address and to calculate a destination address. The second microinstruction instructs the microprocessor to perform an arithmetic or logical operation on the loaded memory operand to generate a result. The third microinstruction instructs the microprocessor to write the result to memory at the destination address calculated by the first microinstruction. A first execution unit receives the first microinstruction and responsively calculates the source address and loads the memory operand into the microprocessor from memory at the source address. A second execution unit also receives the first microinstruction and calculates the destination address. The first and second execution units are distinct execution units within the microprocessor.

In another aspect, the present invention provides a method for executing a macroinstruction in a microprocessor having a macroinstruction set in its macroarchitecture that includes the macroinstruction that instructs the microprocessor to perform a read/modify/write operation on an operand in memory. The method includes translating the macroinstruction into exactly three microinstructions to perform the read/modify/write operation on the memory operand, wherein the three microinstructions are first, second, and third microinstructions. The first microinstruction instructs the microprocessor to calculate a source address and to load the memory operand into the microprocessor from memory at the source address and to calculate a destination address. The second microinstruction instructs the microprocessor to modify the loaded memory operand to generate a result. The third microinstruction instructs the microprocessor to write the result to memory at the destination address calculated by the first microinstruction. The method also includes receiving the first microinstruction by both first and second execution units of the microprocessor. The method also includes calculating the source address and loading the memory operand into the microprocessor from memory at the source address. The calculating the source address and the loading are performed by a first execution unit of the microprocessor in response to the receiving the first microinstruction. The method also includes calculating the destination address. The calculating the destination address is performed by a second execution unit of the microprocessor in response to the receiving the first microinstruction. The first and second execution units are distinct execution units within the microprocessor.

In another aspect, the present invention provides a microprocessor having a macroinstruction set in its macroarchitecture that includes a macroinstruction that instructs the microprocessor to perform a read/modify/write operation on a memory operand having an address. A cache memory caches data including the memory operand. An instruction translator translates the macroinstruction into three microinstructions to perform the read/modify/write operation on the memory operand. A first execution unit calculates the address of the memory operand and loads the operand from the cache memory into a register of the microprocessor as directed by the first microinstruction. A second execution unit calculates the address of the memory operand, also as directed by the first microinstruction. A third execution unit performs an arithmetic or logical operation on the operand from the register to generate a result in response to the second microinstruction, after the first execution unit loads the operand from cache memory. A fourth execution unit stores the result to the cache memory at the address calculated by the second execution unit, as directed by the third microinstruction. The first, second, third, and fourth execution units are distinct execution units within the microprocessor.

In another aspect, the present invention provides a microprocessor having a macroinstruction set in its macroarchitecture that includes a macroinstruction that instructs the microprocessor to perform a read/modify/write operation on an operand in memory. An instruction translator translates the macroinstruction into a plurality of microinstructions to perform the read/modify/write operation on the memory operand. First and second execution units receive a first of the plurality of microinstructions, where the first execution unit executes the read operation on the memory operand, and the second execution unit executes the write operation on the memory operand. The first and second execution units are distinct execution units within the microprocessor. A reorder buffer is coupled to the instruction translator and to the first and second execution units, and has a plurality of entries for storing microinstructions. The microprocessor allocates a single entry to store the first microinstruction even though both of the first and second execution units receive and execute the first microinstruction.

In another aspect, the present invention provides a microprocessor having a macroinstruction set in its macroarchitecture that includes a macroinstruction that instructs the microprocessor to perform a read/modify/write operation on a memory operand having an address. An instruction translator translates the macroinstruction into exactly three microinstructions to perform the read/modify/write operation on the memory operand. A first execution unit is exclusively configured among all the execution units of the microprocessor to calculate read operation addresses of memory operands. A second execution unit is exclusively configured among all the execution units of the microprocessor to calculate write operation addresses of memory operands. The first and second execution units are distinct execution units within the microprocessor. The microprocessor dispatches one of the three microinstructions to the first execution unit to calculate the read operation address of the memory operand, and dispatches the one of the three microinstructions to the second execution unit to calculate the write operation address of the memory operand.

BRIEF DESCRIPTION OF THE DRAWINGS

FIG. 2 is a block diagram illustrating the Execution Units of the microprocessor of FIG. 1 according to the present invention.

FIG. 3 is a diagram illustrating details of the LD/STA Microinstruction according to the present invention.

FIG. 4 is a diagram illustrating fields of an entry of the ROB of FIG. 1 according to the present invention.

DETAILED DESCRIPTION OF THE INVENTION

Figure 1:
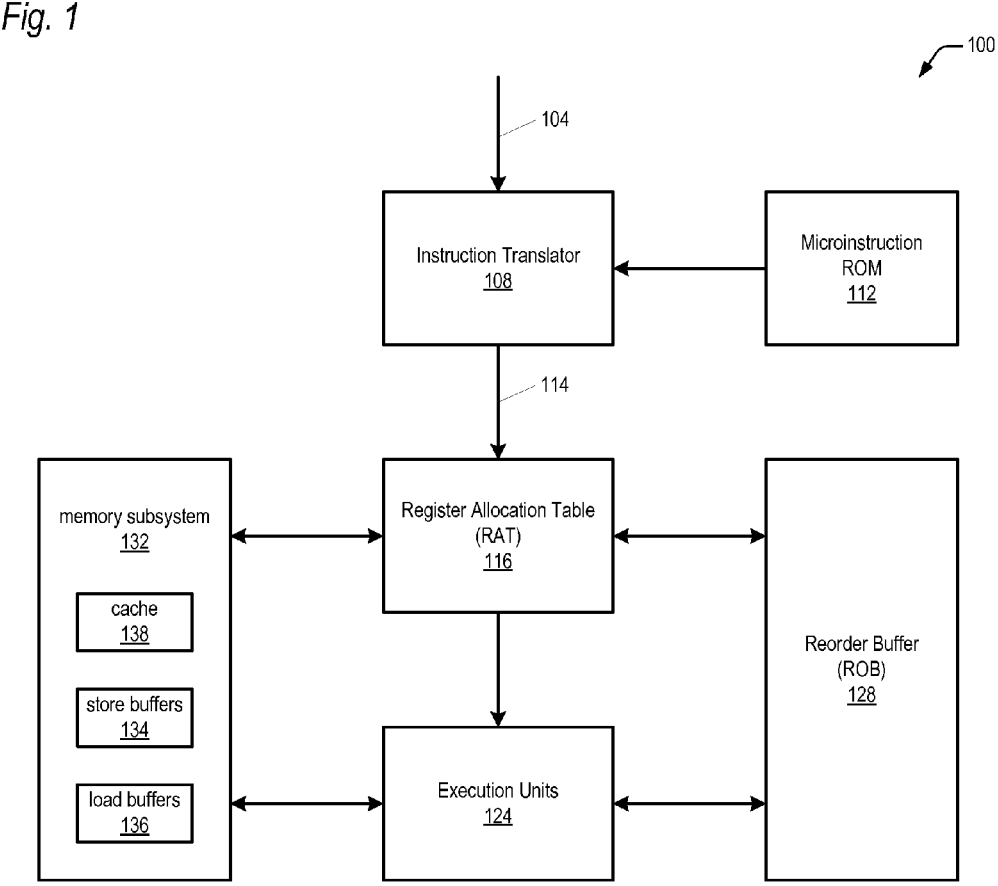
FIG. 1 is a block diagram illustrating a microprocessor according to the present invention.

Referring now to FIG. 1, a block diagram illustrating a microprocessor 100 according to the present invention is shown. The microprocessor 100 includes an Instruction Translator 108, a Microinstruction ROM 112 coupled to the Instruction Translator 108, a Register Allocation Table (RAT) 116 coupled to the Instruction Translator 108, Execution Units 124 coupled to the RAT 116, a Reorder Buffer (ROB) 128 coupled to the RAT 116 and Execution Units 124, and a memory subsystem 132 coupled to the RAT 116 and Execution Units 124. The memory subsystem 132 includes a cache memory 138 that caches data of the system memory. In one embodiment, the cache memory 138 performs both read caching and write caching. The cache memory 138 may include separate instruction and data caches or a single unified memory or both. The cache 138 may include a hierarchy of memories, such as one or more level-1 caches and a level-2 cache. The memory subsystem 132 also includes store buffers 134 used to buffer data destined for memory, which may include a cache memory of the microprocessor 100, and load buffers 136 used to buffer data received from memory. The microprocessor 100 is a superscalar processor because it is capable of issuing multiple microinstructions to the Execution Units 124 per clock cycle. Additionally, the microprocessor 100 is an out-of-order execution processor because the Execution Units 124, both collectively and individually, are allowed to execute their respective microinstructions in an order different than the program order of their corresponding macroinstructions. In one embodiment, the microprocessor 100 has an x86 macroarchitecture, i.e., it supports the IA-32 instruction set and includes the IA-32 user-visible register set.

The Instruction Translator 108 receives Macroinstructions 104 from an instruction cache (not shown) and responsively translates each Macroinstruction 104 into one or more Microinstructions 114 that collectively perform the operation specified by the Macroinstruction 104. In one embodiment, the width of the Instruction Translator 108 is three. That is, the Instruction Translator 108 is capable of generating up to three Microinstructions 114 per clock cycle. Depending upon the mix of Macroinstructions 104, the Instruction Translator 108 can generate the three Microinstructions 114 in one clock cycle from one, two, or three Macroinstructions 104. That is, if each of the next three Macroinstructions 104 to be translated require only a single Microinstruction 114, then all three Macroinstructions 104 can be translated in a single clock cycle; alternatively, if one the next two Macroinstructions 104 requires two Microinstructions 114 and the other of the next two Macroinstructions 104 requires one Microinstruction 114, then the next two Macroinstructions 104 can be translated in a single clock cycle; alternatively, if the next Macroinstruction 104 to be translated requires three Microinstructions 114, then the next Macroinstruction 104 can be translated in a single clock cycle. If the next Macroinstruction 104 to be translated requires more than three Microinstructions 114, then control is transferred to a Microinstruction 114 sequence in the Microinstruction ROM 112 to supply the additional Microinstructions 114 beyond the capacity of the Instruction Translator 108. Advantageously, the Instruction Translator 108 of the present invention translates LdAluSt Macroinstructions 104 into three Microinstructions 114, which avoids the need to transfer control to a Microinstruction 114 sequence in the Microinstruction ROM 112, thereby providing potentially improved performance. Further advantageously, the microinstruction set of the microprocessor 100 includes a new Load Data/Store Address (LD/STA) Microinstruction 304 (described with respect to FIG. 3), which is one of the three Microinstructions 114 into which the Instruction Translator 108 translates the LdAluSt Macroinstruction 104. The LD/STA Microinstruction 304 is unique in that it is issued to two different Execution Units 124, rather than to a single Execution Unit 124 like conventional Microinstructions 114. The generation, operation, and retirement of the LD/STA Microinstruction 304 is described in more detail herein.

Before describing the microprocessor 100 of FIG. 1 in more detail and how the microprocessor 100 processes a LdAluSt Macroinstruction according to embodiments of the present invention, a brief description of a different way the microprocessor 100 could process a LdAluSt Macroinstruction will now be provided so that the reader may more thoroughly appreciate advantages of the present invention.

Figure 5:
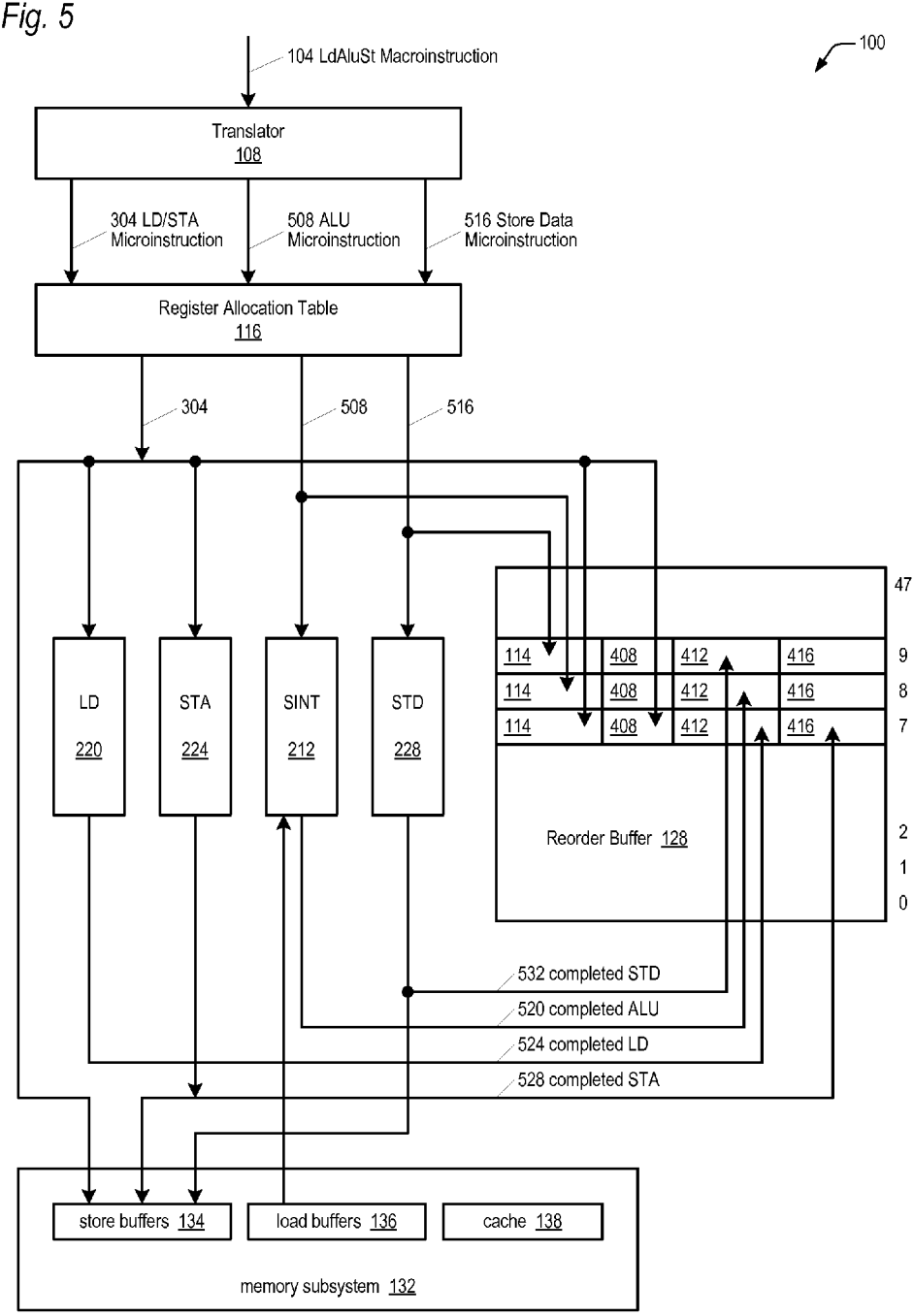
FIG. 5 is a block diagram illustrating the flow of the Microinstructions of FIG. 1 generated in response to a LdAluSt Macroinstruction of FIG. 1, which include a LD/STA microinstruction of FIG. 3, according to the present invention.

The microinstruction set of the microprocessor 100 also includes a LD microinstruction, various ALU microinstructions (such as the ALU Microinstruction 508 of FIG. 5), a STA microinstruction, and a STD microinstruction (such as the STD Microinstruction 516 of FIG. 5). The LD microinstruction instructs the microprocessor 100 to load data (i.e., a memory operand) into a destination register of the microprocessor 100 from a load memory address calculated from operands of the LD microinstruction. The ALU microinstructions instruct the microprocessor 100 to perform an arithmetic or logical operation on one or more operands in registers of the microprocessor 100 to generate a result that is stored in a register of the microprocessor 100. The STA microinstruction instructs the microprocessor 100 to calculate a store memory address from operands of the STA microinstruction and to write the calculated store memory address to a store buffer previously allocated for the STA microinstruction. The STD microinstruction instructs the microprocessor 100 to write data from a register of the microprocessor 100 to a store buffer, such as the store buffer allocated for the STA microinstruction, so that the data can be subsequently written to memory by a memory subsystem of the microprocessor 100. The Instruction Translator 108 of the microprocessor 100 could translate a LdAluSt Macroinstruction 104 into four distinct Microinstructions 114 (the LD, ALU, STA, and STD microinstructions described above) that would be executed by four distinct Execution Unit 124: a LD Unit 220 (of FIG. 2), an SINT Unit 224 (of FIG. 2), a STA Unit 224 (of FIG. 2), and a STD Unit 228 (of FIG. 2), respectively. However, this would require either a 4-microinstruction-wide Instruction Translator 108 or a transfer to a microcode sequence in the Microcode ROM 112 in the case of a 3-microinstruction-wide Instruction Translator 108. As described herein, the new LD/STA Microinstruction 304 of the present invention advantageously allows the Instruction Translator 108 to be a 3-microinstruction-microinstruction-wide translator. Alternatively, the LD/STA Microinstruction 304 of the present invention allows a second Macroinstruction 104 to be translated in the same cycle as a LdAluSt Macroinstruction if the second Macroinstruction 104 requires only a single Microinstruction 114.

Advantageously, the LD/STA Microinstruction 304 combines the separate LD and STA Microinstructions 114 into a single Microinstruction 114. These two microinstructions can be combined into one microinstruction since the operands of the STA Microinstruction 114 includes the same operands as the LD Microinstruction 114 that are used to calculate the same memory address of the memory operand. The microprocessor 100 dispatches the LD/STA Microinstruction 304 of the present invention simultaneously to both the LD Unit 220 and the STA Unit 224. Macroinstructions commonly take a memory operand, perform an operation on it, and store the result back into the original memory location of the operand. The new LD/STA Microinstruction 114 takes advantage of this aspect of the LdAluSt Macroinstruction, namely that the source and destination memory addresses are the same.

Because the LD/STA Microinstruction 304 is issued to two different execution units, it cannot be retired from the ROB 128 until both execution units have completed execution. Thus, a flag 408 (of FIG. 4) has been added to each ROB 128 entry 404 (of FIG. 4) to provide an indication whether a LD/STA microinstruction 304 occupies the ROB entry 404. Additionally, flags 412 and 416 (of FIG. 4) have been added to provide an indication that both the LD Unit 220 and STA Unit 224 have completed execution, respectively. In this way, the LD/STA microinstruction 304 will not be retired until both execution units have processed the LD/STA microinstruction 304 and set the respective flags 412/416 in that ROB entry 404 allocated to the LD/STA microinstruction 304.

Referring again to FIG. 1, the RAT 116 receives the Microinstructions 114 from the Instruction Translator 108 and Microinstruction ROM 112 and determines dependencies among the Microinstructions 114. Because the microprocessor 100 is an out-of-order processor, the Execution Units 124 use the dependency information generated by the RAT 116 to determine when all the source operands of a Microinstruction 114 are available to that the Execution Unit 124 can execute the Microinstruction 114. The RAT 116 also allocates the next available entry 404 in the ROB 128 for each Microinstruction 114. Once the RAT 116 calculates the dependencies and allocates a ROB entry 404, the RAT 116 dispatches the Microinstruction 114 to the appropriate Execution Unit 124 that is equipped to execute the particular type of Microinstruction 114. Although the Execution Units 124 execute the Microinstructions 114 out-of-order with respect to the macroinstruction program order, the ROB 128 retires the Microinstructions 114 and their associated Macroinstructions 104 in program order. Furthermore, the Instruction Translator 108 translates the Macroinstructions 104 in program order and generates the associated Microinstructions 114 in program order. Additionally, the RAT 116 allocates entries 404 in the ROB 128 in program order.

The ROB 128 is a circular FIFO buffer that receives the Microinstructions 114 from the RAT 116 in program order. In one embodiment, the ROB 128 includes 48 entries 404. Each ROB 128 entry 404 has an index, or tag 420 (of FIG. 4). The tag 420 identifies the Microinstruction 114 in the ROB entry 404. When an Execution Unit 124 completes execution of a Microinstruction 114, the Execution Unit 124 provides the tag 420 of the executed Microinstruction 114 to the ROB 128. The ROB 128 then updates a flag 412/416 (of FIG. 4) in the entry 404 associated with the executed Microinstruction 114 to indicate that the Microinstruction 114 is ready to be retired. Each ROB 128 entry 404 includes a LD/STA Flag 408 (shown in FIG. 4) to indicate whether the Microinstruction 114 in the ROB 128 entry 404 is a LD/STA Microinstruction 304. In one embodiment, each ROB 128 entry 404 includes a LD Completed Flag 412 and a STA Completed Flag 416 (shown in FIG. 4), which are set by respective Execution Units 124 that complete their respective portion of a LD/STA Microinstruction 304, as described in more detail below.

The Execution Units 124 execute individual Microinstructions 114 and then signal execution completion to the ROB 128. The ROB 128 retires Microinstructions 114 in program order by waiting until the completion flag of the oldest Microinstruction 114 indicates it has completed execution. In the case of a LD/STA Microinstruction 304, the ROB 128 waits until both the LD Completed Flag 412 and a STA Completed Flag 416 (shown in FIG. 4) indicate it has completed, as described in more detail below. In one embodiment, the ROB 128 is capable of retiring as many as three Macroinstructions 104 per clock cycle. Each Execution Unit 124 includes an instruction queue referred to as a reservation station (not shown) that receives Microinstructions 114 to execute from the RAT 116 or the ROB 128. Each clock cycle, each Execution Unit 124 may receive one Microinstruction 114 from its respective reservation stations. Only Microinstructions 114 whose source operands are ready may be issued from the reservation station to the Execution Unit 124.

When the RAT 116 outputs Microinstructions 114 on its output bus during a given clock cycle, each Execution Unit 124 monitors the Microinstructions 114 to detect whether any of the Microinstructions 114 are of a type that is to be executed by the respective Execution Unit 124. If so, and if an entry in the Execution Unit's 124 reservation station is free, the Execution Unit 124 loads the Microinstruction 114 into the free reservation station entry. If the Execution Unit 124 does not have any free reservation station entries, the ROB 128 subsequently outputs the Microinstruction 114 until it is received by an Execution Unit 124. In the case of a LD/STA Microinstruction 304, both the LD Unit 220 and the STA Unit 224 (of FIG. 2) receive the LD/STA Microinstruction 304 into their respective reservation stations for subsequent execution.

Additionally, when the RAT 116 outputs Microinstructions 114 on its output bus during a given clock cycle, the memory subsystem 132 monitors the Microinstructions 114 to detect whether any of the Microinstructions 114 are a LD/STA Microinstruction 304 or a LD Microinstruction. If so, the memory subsystem 132 allocates a load buffer 136 for the LD/STA Microinstruction 304 or LD Microinstruction. The memory subsystem 132 saves the ROB 128 tag 420 associated with the LD/STA Microinstruction 304 or STA Microinstruction that is output by the RAT 116 and stores an identifier of the allocated load buffer 136 in the ROB entry 404 associated with the LD/STA Microinstruction 304 or LD Microinstruction. As mentioned above, the RAT 116 outputs the Microinstructions 114 in program order, and the memory subsystem 132 allocates the load buffers 136 in program order. Similarly, when the RAT 116 outputs Microinstructions 114 on its output bus during a given clock cycle, the memory subsystem 132 monitors the Microinstructions 114 to detect whether any of the Microinstructions 114 are a LD/STA Microinstruction 304 or a STA Microinstruction. If so, the memory subsystem 132 allocates a store buffer 134 for the LD/STA Microinstruction 304 or STA Microinstruction. The memory subsystem 132 saves the ROB 128 tag 420 associated with the LD/STA Microinstruction 304 or STA Microinstruction that is output by the RAT 116 and stores an identifier of the allocated store buffer 134 in the ROB entry 404 associated with the LD/STA Microinstruction 304 or STA Microinstruction. As mentioned above, the RAT 116 outputs the Microinstructions 114 in program order, and the memory subsystem 132 allocates the store buffers 134 in program order.

Referring now to FIG. 2, a block diagram illustrating the Execution Units 124 of the microprocessor 100 of FIG. 1 according to the present invention is shown. The Execution Units 124 execute Microinstructions 114 in parallel and independently from each other.

The embodiment of FIG. 2 includes seven individual Execution Units 124 denoted 204 through 228. The first execution unit, denoted MEDIA A 204, executes floating point Microinstructions 114. The second execution unit, denoted MEDIA B 208, executes multiply Microinstructions 114. The third execution unit, denoted SINT (Simple Integer) 212, executes integer ALU Microinstructions 114 that perform integer arithmetic or logical operations, such as an ALU Microinstruction 508 (of FIG. 5) generated by the Instruction Translator 108 in response to a LdAluSt Macroinstruction 104. The fourth execution unit, denoted MOV/BR (Move/Branch) 216, executes move or branch Microinstructions 114 as well as simple ALU operations that the SINT unit 212 also executes. The fifth execution unit, denoted LD (Load Data) 220, fetches source operands from memory into registers of the microprocessor 100 for Microinstructions 114 that perform memory load operations, such as LD/STA Microinstructions 304 (of FIG. 3). In order to fetch the source operands from memory, the LD Unit 220 calculates the source memory address for Microinstructions 114 that perform memory load operations, such as LD/STA Microinstructions 304. In one embodiment, the LD Unit 220 is the only Execution Unit 124 that calculates the source memory address for Microinstructions 114 that perform memory load, or read, operations. The sixth execution unit, denoted STA (Store Address) 224, calculates the destination memory address for Microinstructions 114 that perform memory store operations, such as LD/STA Microinstructions 304. In one embodiment, the STA Unit 224 is the only Execution Unit 124 that calculates the destination memory address for Microinstructions 114 that perform memory store, or write, operations. The STA Unit 224 also writes the calculated destination memory address into a store buffer 134 that was previously allocated for the Microinstructions 114 that perform memory store operations, such as LD/STA Microinstructions 304. The seventh execution unit, denoted STD (Store Data) 228, stores the results of Microinstructions 114 from registers to an address in memory specified by the STA Unit 224 for Microinstructions 114 that perform memory store operations, such as a Store Data Microinstruction 516 (of FIG. 5) generated by the Instruction Translator 108 in response to a LdAluSt Macroinstruction 104. Although seven Execution Units 124 are shown, other embodiments are contemplated that include more or fewer Execution Units 124, depending on design requirements and constraints.

Referring now to FIG. 3, a diagram illustrating details of the LD/STA Microinstruction 304 according to the present invention is shown. The LD/STA Microinstruction 304 includes five fields: Opcode 308, Source A 312, Source B 316, Destination 320, and Displacement 324. The Opcode 308 field value uniquely identifies the LD/STA Microinstruction 304 from other microinstructions in the microarchitecture instruction set of the microprocessor 100. The Source Operand A 312 and Source Operand B 316 fields each specify a respective register, such as an architected general purpose register or a temporary register, whose values the LD Unit 220 and STA Unit 224 use as operands to compute their respective load data memory address and store data memory address. The Destination 320 field specifies a register that will receive the source operand from the memory location specified by the load data memory address calculated by the LD Unit 220. The Displacement 324 field includes a constant that is added to the value stored in the register specified by the Source Operand A 312, the value stored in the register specified by the Source Operand B 316, and the value stored in a segment register (in an x86 embodiment, one of the x86 DS/CS/ES/SS segment registers) to form the memory address calculated by the LD Unit 220 and STA Unit 224.

The present inventors observed that the LD Execution Unit 220 and the STA Execution Unit 224 use the same operand fields to calculate their respective memory addresses. Advantageously, the present inventors have combined the functionality of the individual LD Microinstruction 114 and STA Microinstruction 114 into the single LD/STA Microinstruction 304 of the present invention having a distinct Opcode 308 value. The Destination field 320 is unused by the STA Execution Unit 224.

Referring now to FIG. 4, a diagram illustrating fields of an entry 404 of the ROB 128 of FIG. 1 according to the present invention is shown. Each ROB entry 404 includes the following fields: a Microinstruction 114, a LD/STA Flag 408, a LD Completed Flag 412, a STA Completed Flag 416, and a Tag 420. Each ROB entry 404 also includes other fields not shown. In one embodiment, the LD Completed Flag 412 serves as the generic single instruction completed flag that is used by all Microinstructions 114 other than the LD/STA Microinstruction 304 to indicate completion thereof. If the RAT 116 populates the ROB entry 404 with a LD/STA Microinstruction 304, it sets the LD/STA Flag 408, which indicates that there are two Execution Units 124 that must execute the LD/STA Microinstruction 304. In particular, both of the LD Unit 220 and the STA Unit 224 must signal completion before the LD/STA Microinstruction 304 can be retired. The LD Execution Unit 220 sets the LD Completed Flag 412 to indicate to the ROB 128 that it has completed execution of the LD/STA microinstruction 304, and the STA Execution Unit 224 sets the STA Completion Flag 416 to indicate to the ROB 128 that it has completed execution of the LD/STA Microinstruction 304. The Tag field 420 in the ROB entry 404 is the index of the entry 404 within the ROB 128 and is used by various circuits of the microprocessor 100 to identify the Microinstruction 114.

Referring now to FIG. 5, a block diagram illustrating the flow of the Microinstructions 114 of FIG. 1 generated in response to a LdAluSt Macroinstruction 104 of FIG. 1, which include a LD/STA microinstruction 304 of FIG. 3, according to the present invention is shown. FIG. 5 includes the Instruction Translator 108, RAT 116 and ROB 128 of FIG. 1. FIG. 5 also includes the LD Unit 220, STA Unit 224, SINT Unit 212, and STD Unit 228 of FIG. 2. The Instruction Translator 108 receives a LdAluSt Macroinstruction 104 and generates three microinstructions in a single clock in the following order: a LD/STA Microinstruction 304; an ALU Microinstruction 508; and a Store Data Microinstruction 516. These three microinstructions perform all the operations associated with the LdAluSt Macroinstruction 104. The LD Unit 220 generates a completed LD signal 524; the STA Unit 224 generates a completed STA signal 528; the SINT Unit 212 generates a completed ALU signal 520; and the STD Unit 228 generates a completed STD signal 532; each of which is described in more detail below with respect to FIG. 6. The ROB 128 of FIG. 5 illustrates three different ROB entries 404 of FIG. 4. In the example of FIG. 5, the RAT 116 has allocated the ROB entry 404 with a tag (or index) of 7 to the LD/STA Microinstruction 304, the ROB entry 404 with a tag of 8 to the ALU Microinstruction 508, and the ROB entry 404 with a tag of 9 to the Store Data Microinstruction 516. FIG. 5 will now be explained in more detail with respect to the flowchart of FIG. 6.

Figure 6:
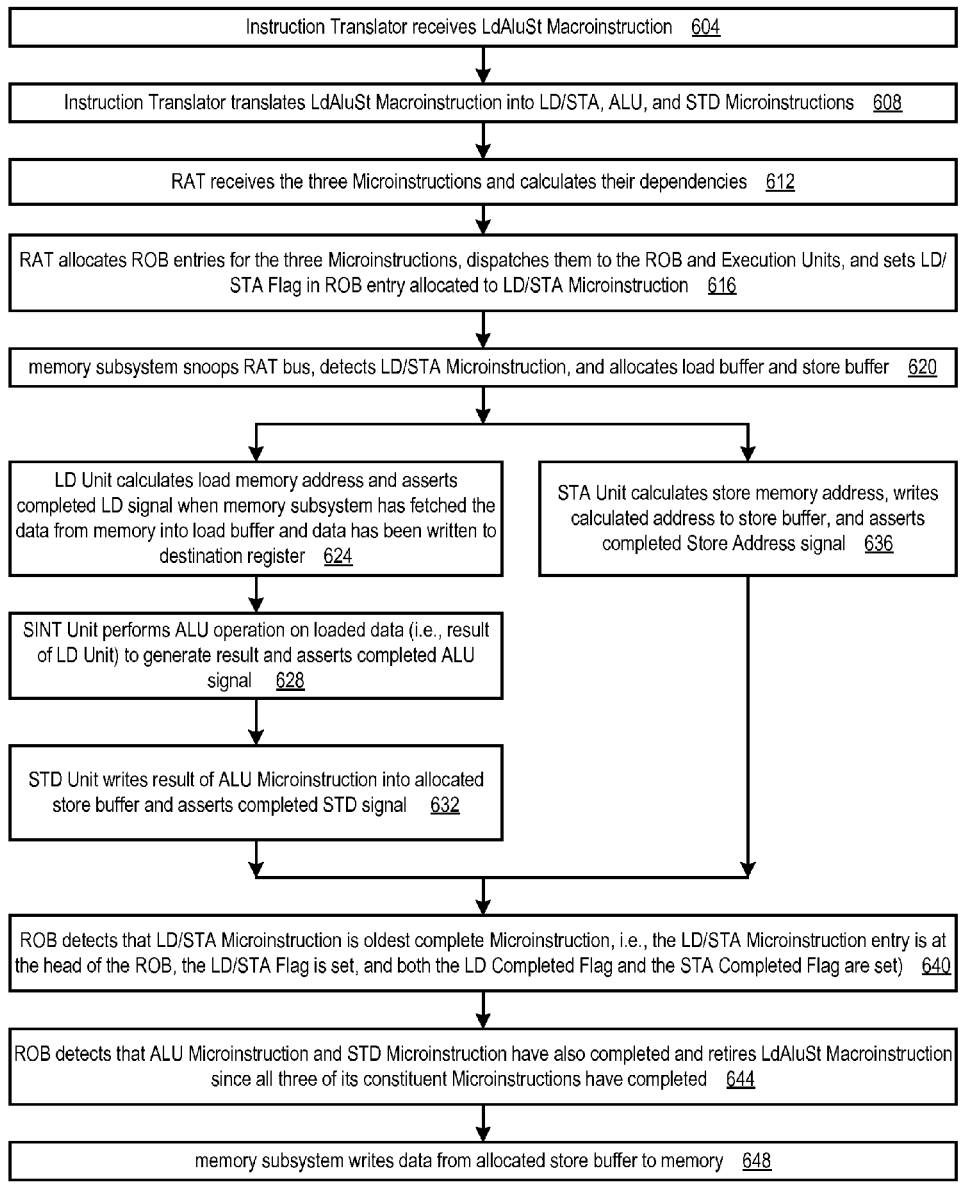
FIG. 6 is a flowchart illustrating operation of the microprocessor of FIG. 1 to execute a LdAluSt Macroinstruction of FIG. 5 according to the present invention.

Referring now to FIG. 6, a flowchart illustrating operation of the microprocessor 100 of FIG. 1 to execute a LdAluSt Macroinstruction 104 of FIG. 5 according to the present invention is shown. Flow begins at block 604.

At block 604, the Instruction Translator 108 receives a LdAluSt Macroinstruction 104 of the form:

[Mem]←[Mem] [Integer ALU Operation] [ALU source]
For example, the LdAluSt Macroinstruction 104 may be an x86 ADD [Mem], EAX instruction discussed above. The [Mem] is a memory address calculated according to one of the addressing modes of the macroarchitecture, which in the x86 architecture includes generating an address from a single register, a constant, or a combination of registers and constants, for example. The [ALU Operation] refers to an arithmetic or logical operation, such as an addition, subtraction, Boolean logical operation, compare, shift, rotate, move, bit scan, and so forth, performed by arithmetic logic unit (ALU), such as the SINT Unit 212, or MOVE/BR Unit 216 of FIG. 2. The [ALU source] is provided from an architectural register or may be a constant. It is noted that the memory operand is both a source operand and a destination operand such that the destination memory address and source memory address of the LdAluSt Macroinstruction 104 are the same. Consequently, the source operands of the Microinstruction 114 used to calculate the load address will be the same as the source operands of the Microinstruction 114 used to calculate the store address. Flow proceeds to block 608.

At block 608, In response to the LdAluSt Macroinstruction 104, the Instruction Translator 108 generates three microinstructions in a single clock in the following order: a LD/STA Microinstruction 304 of FIG. 3; an ALU Microinstruction 508 of FIG. 5; and a Store Data Microinstruction 516 of FIG. 5. The three Microinstructions 304/508/516 perform all the operations required to execute the LdAluSt Macroinstruction 104. Flow proceeds to block 612.

At block 612, the RAT 116 receives the three Microinstructions 304/508/516 from the Instruction Translator 108 and calculates dependencies between the Microinstructions 304/508/516 and between them and/or other microinstructions within the microinstruction stream generated from other macroinstructions within the macroinstruction stream. The ALU Microinstruction 508 depends on the result of the LD/STA Microinstruction 304 since one of the source operands of the ALU Microinstruction 508 is the memory operand loaded by the LD/STA Microinstruction 304. The ALU Microinstruction 508 may also depend upon the result of another Microinstruction 114 that supplies the other source operand, such as the EAX register value in the x86 ADD [mem], EAX instruction example discussed above. The Store Data Microinstruction 516 depends on the result of the ALU Microinstruction 508 since the ALU Microinstruction 508 result is the data that the Store Data Microinstruction 516 will write to a store buffer 134 for subsequent storage to memory, such as system memory or cache 138. The store buffer 134 allocated (at block 616 below) for the LD/STA Microinstruction 304 must wait to write the result to memory until the LD/STA Microinstruction 304 has written the store address to the store buffer 134 and the Store Data Microinstruction 516 has written the result of the ALU Microinstruction 508 into the store buffer 134. The LD/STA Microinstruction 304 and the Store Data Microinstruction 516 are not dependent upon each another and can therefore execute out of order with respect to one another. This is true for the LD/STA Microinstruction 304 as it executes in both the LD Unit 220 and the STA Unit 224. However, the LD/STA Microinstruction 304 as it executes in both the LD Unit 220 and the STA Unit 224 may depend upon the result of other instructions that supply Source A 312 and Source B 316 operands of FIG. 3 that are used to calculate the load memory address and store memory address, respectively, such as general purpose register operands or segment register operands. Flow proceeds to block 616.

At block 616, the RAT 116 allocates a ROB entry 404 for each of the three Microinstructions 304/508/516 in order and writes the dependency information for each into the allocated ROB entry 404 associated with each of the three Microinstructions 304/508/516. When the RAT 116 allocates the ROB entries 404, the ROB 128 clears the LD/STA Flag 408, LD Completed Flag 412, and STA Completed Flag 416 of FIG. 4 for each allocated ROB entry 404. The RAT 116 also dispatches, or outputs, the three Microinstructions 304/508/516 on its output bus to the ROB 128 and to the Execution Units 124. In response, the ROB 128 receives the three Microinstructions 304/508/516 into their respective allocated entries 404. In the example of FIG. 5, ROB entry 7 receives the LD/STA Microinstruction 304, ROB entry 8 receives the ALU Microinstruction 508, and ROB entry 9 receives the Store Data Microinstruction 516. Also, the LD Unit 220 and STA Unit 224 snoop the RAT 116 bus and both receive the LD/STA Microinstruction 304 into their respective reservation stations; the SINT Unit 212 snoops the RAT 116 bus and receives the ALU Microinstruction 508 into its reservation station; and the STD Unit 228 snoops the RAT 116 bus and receives the Store Data Microinstruction 516 into its reservation station, all as shown in FIG. 5. Additionally, the RAT 116 also sets the LD/STA Flag 408 for the ROB entry 404 that was allocated to the LD/STA Microinstruction 304, which is entry 7 in the example of FIG. 5. Flow proceeds to block 620.

At block 620, the memory subsystem 132 snoops the RAT 116 bus, detects the LD/STA Microinstruction 304, and responsively allocates a store buffer 134 and a load buffer 136 for the LD/STA Microinstruction 304. Flow proceeds from block 620 to blocks 624 and 636.

At block 624, once all of the LD/STA Microinstruction 304 source operands are ready, the LD Unit 220 calculates the load memory address from the operands specified by the Source A 312, Source B 316, and Displacement 324 fields and requests the memory subsystem 132 to fetch the data specified by the calculated load memory address into the load buffer 136 allocated at block 620. When the data has been received into the load buffer 136, the LD Unit 220 writes the data into a register of the microprocessor 100 specified by the Destination 320 field of FIG. 3. The LD Unit 220 then asserts the completed LD signal 524 of FIG. 5 to set the LD Completed Flag 412 in ROB entry 7 that was allocated to the LD/STA Microinstruction 304 at block 616. Flow proceeds from block 624 to block 628.

At block 628, once the LD Unit 220 has completed its portion of the LD/STA Microinstruction 304 at block 624, the SINT Unit 212 performs the ALU operation specified by the ALU Microinstruction 508 on the data loaded at block 624 to generate a result. The SINT Unit 212 also asserts the completed ALU signal 520 of FIG. 5 to set the LD Completed Flag 412 in ROB entry 8 that was allocated to the ALU Microinstruction 508 at block 616. It is noted that the ALU Microinstruction 508 may also be executed by the MOVE/BR Unit 216 of FIG. 2. Flow proceeds to block 632.

At block 632, once the SINT Unit 212 has completed the ALU Microinstruction 508 at block 628, the STD Unit 228 writes the result of the ALU Microinstruction 508 to the store buffer 134 allocated at block 620. The STD Unit 228 also asserts the completed STD signal 532 of FIG. 5 to set the LD Completed Flag 412 in ROB entry 9 that was allocated to the STD Microinstruction 516 at block 616. Flow proceeds from block 632 to block 640.

At block 636, once all of the LD/STA Microinstruction 304 source operands are ready, the STA Unit 224 calculates the store memory address from the operands specified by the Source A 312, Source B 316, and Displacement 324 fields and writes the calculated store memory address into the store buffer 134 allocated at block 620. As mentioned above, the Destination 320 field of the LD/STA Microinstruction 304 is not used by the STA Unit 224. The STA Unit 224 then asserts the completed STA signal 528 of FIG. 5 to set the STA Completed Flag 416 in ROB entry 7 that was allocated to the LD/STA Microinstruction 304 at block 616. Flow proceeds from block 636 to block 640.

At block 640, the ROB 128 detects that the LD/STA Microinstruction 304 is the oldest complete Microinstruction 114 in the ROB 128. That is, the ROB 128 detects that the LD/STA Microinstruction 304 is in the entry at the head of the circular ROB 128 queue, the entry (entry 7 in the example of FIG. 5) has the LD/STA Flag 408 set according to block 616, and the LD Completed Flag 412 is set (according to block 624) and the STA Completed Flag 416 is set (according to block 636). Flow proceeds to block 644.

At block 644, the ROB 128 detects that, in addition to the LD/STA Microinstruction 304 having completed, the ALU Microinstruction 508 is complete (according to block 628) and the STD Microinstruction 516 has completed (according to block 632), and responsively retires the LdAluSt Macroinstruction 104. Flow proceeds to block 648.

At block 648, the memory subsystem 132 eventually writes the data that was written to the store buffer 134 at block 632 to memory, such as system memory or cache 138. Flow ends at block 648.

Although the present invention and its objects, features, and advantages have been described in detail, other embodiments are encompassed by the invention. For example, although embodiments have been described in which the instruction translator generates up to three microinstructions per clock, other embodiments are contemplated in which the instruction translator generates more than three microinstructions per clock. For example, in a microprocessor with a four microinstruction-wide instruction translator, the single LD/STA microinstruction advantageously enables the instruction translator to translate a LdAluSt macroinstruction into three microinstructions and to translate a second macroinstruction into a fourth microinstruction in the same clock cycle.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A microprocessor having a macroinstruction set in its macroarchitecture that includes a macroinstruction that instructs the microprocessor to perform a read/modify/write operation on an operand in memory, the microprocessor comprising:
   an instruction translator, configured to translate the macroinstruction into exactly three microinstructions to perform the read/modify/write operation on the memory operand, wherein the three microinstructions are first, second, and third microinstructions;
   wherein the first microinstruction instructs the microprocessor to calculate a source address and to load the memory operand into the microprocessor from memory at the source address and to calculate a destination address;
   wherein the second microinstruction instructs the microprocessor to perform an arithmetic or logical operation on the loaded memory operand to generate a result;
   wherein the third microinstruction instructs the microprocessor to write the result to memory at the destination address calculated by the first microinstruction;
   a first execution unit, configured to receive the first microinstruction, to responsively calculate the source address and to load the memory operand into the microprocessor from the memory at the source address; and
   a second execution unit, configured to also receive the first microinstruction, to responsively calculate the destination address, wherein the first and second execution units are distinct execution units within the microprocessor.

2. The microprocessor of claim 1, wherein the instruction translator is configured to output at most three microinstructions per clock cycle.

3. The microprocessor of claim 1, wherein the instruction translator is configured to output more than three microinstructions per clock cycle, wherein the instruction translator is configured to translate a second macroinstruction into a fourth microinstruction during a same clock cycle as the instruction translator translates the first macroinstruction into the exactly three microinstructions.

4. The microprocessor of claim 1, further comprising:
a reorder buffer, coupled to the instruction translator and to the first and second execution units, configured to store the first microinstruction into a single entry of the reorder buffer even though the first microinstruction is executed by both the first and second execution units.

5. The microprocessor of claim 4, wherein each of the first and second execution units is further configured to subsequently provide to the reorder buffer a respective indication that the first microinstruction has been executed.

6. The microprocessor of claim 5, wherein the reorder buffer is configured to retire the first microinstruction only after receiving from both of first and second execution units the respective indications that the first microinstruction has been executed.

7. The microprocessor of claim 4, wherein the single entry of the reorder buffer includes a flag indicating the first microinstruction is of a type of microinstruction of a microinstruction set of the microprocessor to be executed by both the first and second execution units of the microprocessor.

8. The microprocessor of claim 1, wherein the microprocessor refrains from invoking a microinstruction sequence in a microinstruction ROM to execute the macroinstruction.

9. The microprocessor of claim 1, further comprising:
a third execution unit, configured to modify the loaded memory operand to generate a result.

10. The microprocessor of claim 9, further comprising:
a fourth execution unit, configured to write the result to memory at the destination address calculated by the first microinstruction.

11. A method for executing a macroinstruction in a microprocessor having a macroinstruction set in its macroarchitecture that includes the macroinstruction that instructs the microprocessor to perform a read/modify/write operation on an operand in memory, the method comprising:
translating the macroinstruction into exactly three microinstructions to perform the read/modify/write operation on the memory operand, wherein the three microinstructions are first, second, and third microinstructions;
wherein the first microinstruction instructs the microprocessor to calculate a source address and to load the memory operand into the microprocessor from memory at the source address and to calculate a destination address;
wherein the second microinstruction instructs the microprocessor to modify the loaded memory operand to generate a result;
wherein the third microinstruction instructs the microprocessor to write the result to memory at the destination address calculated by the first microinstruction;
receiving the first microinstruction by both first and second execution units of the microprocessor;
calculating the source address and loading the memory operand into the microprocessor from memory at the source address, wherein said calculating the source address and said loading are performed by a first execution unit of the microprocessor in response to said receiving; and
calculating the destination address, wherein said calculating the destination address is performed by a second execution unit of the microprocessor in response to said receiving, wherein the first and second execution units are distinct execution units within the microprocessor.

12. The method of claim 11, wherein said translating is performed by an instruction translator of the microprocessor, wherein the instruction translator is configured to output at most three microinstructions per clock cycle.

13. The method of claim 11, wherein said translating is performed by an instruction translator of the microprocessor, wherein the instruction translator is configured to output more than three microinstructions per clock cycle, the method further comprising:
translating a second macroinstruction into a fourth microinstruction during the same clock cycle as the instruction translator translates the first macroinstruction into the exactly three microinstructions.

14. The method of claim 11, further comprising:
storing the first microinstruction into a single entry of a reorder buffer of the microprocessor even though the first microinstruction is executed by both the first and second execution units.

15. The method of claim 14, further comprising:
providing a first indication to the reorder buffer that the first microinstruction has been executed subsequent to said loading, wherein said providing the first indication is performed by the first execution unit;
providing a second indication to the reorder buffer that the first microinstruction has been executed subsequent to said calculating, wherein said providing the second indication is performed by the second execution unit.

16. The method of claim 15, further comprising:
retiring the first microinstruction only after receiving both the first and second indications that the first microinstruction has been executed.

17. The method of claim 14, wherein the single entry of the reorder buffer includes a flag indicating the first microinstruction is of a type of microinstruction of a microinstruction set of the microprocessor to be executed by both the first and second execution units of the microprocessor.

18. The method of claim 11, wherein the microprocessor refrains from invoking a microinstruction sequence in a microinstruction ROM to execute the macroinstruction.

19. A microprocessor having a macroinstruction set in its macroarchitecture that includes a macroinstruction that instructs the microprocessor to perform a read/modify/write operation on a memory operand having an address, the microprocessor comprising:
a cache memory, configured to cache data including the memory operand;
an instruction translator, configured to translate the macroinstruction into exactly three microinstructions to perform the read/modify/write operation on the memory operand, wherein the three microinstructions are first, second, and third microinstructions;
a first execution unit, configured to calculate the address of the memory operand and to load the operand from the cache memory into a register of the microprocessor in response to the first microinstruction;
a second execution unit, configured to calculate the address of the memory operand also in response to the first microinstruction;
a third execution unit, configured to perform an arithmetic or logical operation on the operand from the register to generate a result in response to the second microinstruction after the first execution unit loads the operand from cache memory; and
a fourth execution unit, configured to store the result to the cache memory at the address calculated by the second execution unit in response to the third microinstruction;
wherein the first, second, third, and fourth execution units are distinct execution units within the microprocessor.

20. The microprocessor of claim 19, further comprising:
a memory subsystem, coupled to the instruction translator, configured to allocate a store buffer of the microprocessor in response to the first microinstruction;
wherein the second execution unit is further configured to write the calculated address of the memory operand to the allocated store buffer in response to the first microinstruction.

21. A microprocessor having a macroinstruction set in its macroarchitecture that includes a macroinstruction that instructs the microprocessor to perform a read/modify/write operation on an operand in memory, the microprocessor comprising:
an instruction translator, configured to translate the macroinstruction into a plurality of microinstructions to perform the read/modify/write operation on the memory operand;
first and second execution units, each configured to receive a first of the plurality of microinstructions, wherein the first execution unit is configured to execute the read operation on the memory operand, wherein the second execution unit is configured to execute the write operation on the memory operand, wherein the first and second execution units are distinct execution units within the microprocessor; and
a reorder buffer, coupled to the instruction translator and to the first and second execution units, having a plurality of entries for storing microinstructions, wherein the microprocessor allocates a single entry configured to store the first microinstruction even though both of the first and second execution units receive and execute the first microinstruction.

22. The microprocessor of claim 21, wherein each of the first and second execution units is configured to provide to the reorder buffer a respective indication that it has executed the first microinstruction.

23. The microprocessor of claim 21, wherein each of the plurality of entries of the reorder buffer includes a flag for indicating whether the microinstruction stored in the entry is of a type of the first microinstruction that must be executed by more than one execution unit.

24. The microprocessor of claim 23, wherein the reorder buffer is configured to wait to retire the microinstruction stored in the entry if the flag indicates the microinstruction is of a type of the first microinstruction that must be executed by more than one execution unit.

25. A microprocessor having a macroinstruction set in its macroarchitecture that includes a macroinstruction that instructs the microprocessor to perform a read/modify/write operation on a memory operand having an address, the microprocessor comprising:
an instruction translator, configured to translate the macroinstruction into exactly three microinstructions to perform the read/modify/write operation on the memory operand;
a first execution unit, exclusively configured among all the execution units of the microprocessor to calculate read operation addresses of memory operands; and
a second execution unit, exclusively configured among all the execution units of the microprocessor to calculate write operation addresses of memory operands, wherein the first and second execution units are distinct execution units within the microprocessor; and
wherein the microprocessor is configured to dispatch one of the three microinstructions to the first execution unit to calculate the read operation address of the memory operand, and to also dispatch the one of the three microinstructions to the second execution unit to calculate the write operation address of the memory operand.

* * * * *